US010551842B2

(12) United States Patent
Lonari (10) Patent No.: US 10,551,842 B2
(45) Date of Patent: Feb. 4, 2020

(54) REAL-TIME VEHICLE STATE TRAJECTORY PREDICTION FOR VEHICLE ENERGY MANAGEMENT AND AUTONOMOUS DRIVE (71) Applicant: HITACHI, LTD., Tokyo (JP)

(72) Inventor: Yashodeep Lonari, Plymouth, MI (US)

(73) Assignee: HITACHI, LTD., Tokyo (JP)

(*) Notice: Subject to any disclaimer, the term of this patent is extended or adjusted under 35 U.S.C. 154(b) by 45 days.

(21) Appl. No.: 15/627,277

(22) Filed: Jun. 19, 2017

(65) Prior Publication Data
US 2018/0364725 A1 Dec. 20, 2018

(51) Int. Cl.
G05D 1/02 (2006.01)
B60W 30/188 (2012.01)
B60W 10/06 (2006.01)
B60W 10/10 (2012.01)
G08G 1/00 (2006.01)
G06N 20/00 (2019.01)

(52) U.S. Cl.
CPC ........... G05D 1/0217 (2013.01); B60W 10/06 (2013.01); B60W 10/10 (2013.01); B60W 30/188 (2013.01); G05D 1/0278 (2013.01); G05D 1/0291 (2013.01); G06N 20/00 (2019.01); G08G 1/22 (2013.01); B60W 2520/10 (2013.01); B60W 2530/14 (2013.01); B60W 2550/402 (2013.01); G05D 2201/0213 (2013.01)

(58) Field of Classification Search
None
See application file for complete search history.

(56) References Cited

U.S. PATENT DOCUMENTS

| 5,319,930 A * | 6/1994 | Shinzawa | F01N 3/027 60/286 |
| 5,893,894 A * | 4/1999 | Moroto | F16H 59/66 701/409 |
| 6,182,000 B1 * | 1/2001 | Ohta | B60K 31/0058 180/170 |
| 7,028,466 B2 * | 4/2006 | Kondou | F01N 3/021 60/285 |
| 7,146,264 B2 * | 12/2006 | Bates | F16H 61/0213 701/59 |

(Continued)

FOREIGN PATENT DOCUMENTS

DE 10 2016 003432 A1 10/2016
EP 2610836 A1 7/2013

(Continued)

OTHER PUBLICATIONS

European Search Report for related EP Patent Application No. 18153422.3, dated Jul. 25, 2018; 8 pages.

(Continued)

Primary Examiner — Dirk Wright
(74) Attorney, Agent, or Firm — Procopio, Cory, Hargreaves & Savitch LLP (57) ABSTRACT Systems and methods described herein are directed to predicting velocity and trajectory of a vehicle based on a route to be navigated for a vehicle, thereby estimating the vehicle drive cycle, for one or more segments of the route. The predicted velocity trajectory is determined from a machine learning function that takes into account historical information from vehicle routes traveled by other vehicles.

6 Claims, 10 Drawing Sheets

(56) References Cited

U.S. PATENT DOCUMENTS

| | | | | |
|---|---|---|---|---|
| 8,015,805 B2* | 9/2011 | Pfaeffle | | F01N 3/023 |
| | | | | 60/274 |
| 8,315,775 B2* | 11/2012 | Biondo | | B60W 30/143 |
| | | | | 180/170 |
| 8,424,294 B2* | 4/2013 | Schumacher | | F01N 9/002 |
| | | | | 60/274 |
| 8,712,650 B2* | 4/2014 | Koebler | | B60L 15/2045 |
| | | | | 701/51 |
| 8,768,587 B2* | 7/2014 | Wulf | | F16H 63/42 |
| | | | | 701/64 |
| 8,862,346 B2* | 10/2014 | Saltsman | | G01M 17/007 |
| | | | | 701/51 |
| 8,881,505 B2* | 11/2014 | Frazier | | B60W 10/06 |
| | | | | 60/285 |
| 9,002,612 B2* | 4/2015 | McNew | | B60W 50/0097 |
| | | | | 701/93 |
| 9,062,984 B2* | 6/2015 | Wolf | | G01C 21/3469 |
| 9,090,260 B2* | 7/2015 | Clarke | | B60W 30/00 |
| 9,102,320 B2* | 8/2015 | McGee | | B60W 50/0097 |
| 9,248,836 B2* | 2/2016 | Johansson | | B60W 50/0097 |
| 9,272,621 B2* | 3/2016 | Sujan | | B60K 31/00 |
| 9,321,447 B2* | 4/2016 | Abuelsaad | | B60W 10/02 |
| 9,371,766 B2* | 6/2016 | Wang | | F01N 9/007 |
| 9,446,766 B2* | 9/2016 | Tanaka | | B60W 10/06 |
| 9,732,646 B2* | 8/2017 | Upadhyay | | F01N 3/0232 |
| 9,889,852 B2* | 2/2018 | Abuelsaad | | B60W 10/02 |
| 9,953,472 B2* | 4/2018 | Pati | | G07C 5/0808 |
| 10,023,188 B2* | 7/2018 | Follen | | B60W 50/0097 |
| 10,029,685 B1* | 7/2018 | Hubbard | | B60W 30/146 |
| 10,089,882 B2* | 10/2018 | Pandy | | B60W 10/04 |
| 10,254,764 B2* | 4/2019 | Laubinger | | G05D 1/0272 |
| 10,309,793 B2* | 6/2019 | Upadhyay | | G01C 21/3469 |
| 2007/0125074 A1* | 6/2007 | Marquardt | | F01N 3/023 |
| | | | | 60/295 |
| 2010/0305798 A1 | 12/2010 | Phillips et al. | | |
| 2011/0313647 A1 | 12/2011 | Koebler et al. | | |
| 2015/0197247 A1* | 7/2015 | Ichinokawa | | B60W 30/143 |
| | | | | 701/93 |
| 2015/0232097 A1 | 8/2015 | Luther et al. | | |
| 2017/0344023 A1* | 11/2017 | Laubinger | | G05D 1/0272 |

FOREIGN PATENT DOCUMENTS

| | | |
|---|---|---|
| JP | 2005214203 A | 8/2005 |
| WO | 2014/016825 A1 | 1/2014 |

OTHER PUBLICATIONS

Fagan, Derek; Meier, Rene, "Intelligent Time of Arrival Estimation", 7 pages. 2011 IEEE Forum on Integrated and Sustainable Transportation Systems, Vienna, Austria Jun. 29-Jul. 1, 2011. 978-1-4577-0992-0/11 Copyright 2011 IEEE.

* cited by examiner

| Historical Routes | Historical GPS data | Traffic information | ... |
|---|---|---|---|
| R1 | G1 | T1 | ... |
| R2 | G2 | T2 | ... |
| R3 | G3 | T3 | ... |
| R4 | G4 | T4 | ... |
| ... | ... | ... | ... |

FIG. 3(b)

| Road segment | Velocity Trajectory | Gear Control | Aftertreatment Control | ... |
|---|---|---|---|---|
| RS1 | V1 | G1 | V1 | ... |
| RS2 | V2 | G2 | V2 | ... |
| RS3 | V3 | G3 | V3 | ... |
| RS4 | V4 | G4 | V4 | ... |
| ... | ... | ... | ... | ... |

REAL-TIME VEHICLE STATE TRAJECTORY PREDICTION FOR VEHICLE ENERGY MANAGEMENT AND AUTONOMOUS DRIVE

BACKGROUND

Field

The present disclosure is generally directed to vehicle systems, and more specifically, to systems and methods for controlling a vehicle based on predicted vehicle trajectory and velocity.

Related Art

In related art implementations, road preview information is applied into automotive applications for systems such as ADAS (advanced driver assistance system). The time scale of such preview information is relatively short term (e.g., about 50-400 seconds). Related art implementations have utilized short-term road preview information to reduce vehicle energy consumption.

SUMMARY

Example implementations of the present disclosure include an on-board vehicle devices which are configured to communicate with systems such as a cloud server, Vehicle to other communication (V2X), and Global Positioning Satellite (GPS) devices to receive routing, weather, upcoming traffic velocity, traffic signal phase and timing, and event information for a given route. Such information along with past historical driving data for the vehicle or other vehicles that have traveled on the route (e.g., same type of vehicle or different types of vehicles) is utilized to predict future vehicle states such as the future vehicle velocity over pre-defined or over a dynamic horizon such as an electronic horizon. The vehicle energy consumption reduction problem is addressed by optimizing energy utilization realized in real world driving schedules/cycles with the inclusion of variation in driving history in city and highway operation.

Example implementations of the present disclosure facilitate the obtaining of short and long term road preview information (e.g., from 10 seconds to 30 minutes) of driving preview. Through utilizing long term preview information, example implementations described herein can achieve significant savings in fuel by optimal scheduling of the powertrain-vehicle system behavior. In example implementations, preview road information for a given route is utilized to minimize excursions into operationally inefficient zones, provide forward looking pre-scheduled operation of the powertrain (e.g., diesel, gasoline, electric vehicles, after-treatment), and rechargeable energy storage systems.

Example implementations utilize machine learning based vehicle speed prediction to determine the electric horizon. The inputs from GPS and traffic flow speeds are utilized to train artificial neural network (ANN) models for predicting vehicle velocities on a given route. The model is utilized to predict vehicle velocities for a test route, the predicted and test vehicle route velocities may result in a good correlation. The estimated velocity trajectory/drive cycle can be used to classify drive cycle and determine equivalence to or equivalent drive cycles from historical driving data.

Vehicle state trajectory prediction over a future horizon can be an important step for vehicle energy management systems and can provide safer control of connected and autonomous vehicles. The predicted vehicle speed trajectory can be utilized to develop efficient gear shift strategies, topology controls for hybrid vehicles, vehicle platooning control, engine and after-treatment controls, and so on. The predicted vehicle speed trajectory can also facilitate optimal powertrain performance over the electric horizon with accounting for powertrain system aging. The predicted vehicle states are further provided as inputs to vehicle and powertrain models hosted in the cloud or on-board with power processing capability controllers.

Aspects of the present disclosure can include a vehicle, having one or more sensors; and a processor. The processor is configured to determine an expected velocity for the vehicle for one or more portions of a route; modify the expected velocity for the one or more portions of the route based on data received from the one or more sensors; and control at least one of an after-treatment system and a gear shift system of the vehicle based on the modified expected velocity.

Aspects of the present disclosure can further include a method, which can involve receiving route information from one or more vehicles; determining an expected velocity for each of the one or more vehicles for one or more portions of a route determined from route information associated with the each of the one or more vehicles; and transmitting the expected velocity for the each of the one or more vehicles.

Aspects of the present disclosure can further include a non-transitory computer readable medium, storing instructions for executing a process, the instructions can involve receiving route information from one or more vehicles; determining an expected velocity for each of the one or more vehicles for one or more portions of a route determined from route information associated with the each of the one or more vehicles; and transmitting the expected velocity for the each of the one or more vehicles.

Aspects of the present disclosure can further include a system, which can involve means for receiving route information from one or more vehicles; means for determining an expected velocity for each of the one or more vehicles for one or more portions of a route determined from route information associated with the each of the one or more vehicles; and means for transmitting the expected velocity for the each of the one or more vehicles.

Aspects of the present disclosure can further include a system, which can involve one or more vehicles configured to provide route information; and a management apparatus, that includes a processor, configured to receive route information from one or more vehicles; determine an expected velocity for each of the one or more vehicles for one or more portions of a route determined from route information associated with the each of the one or more vehicles; and transmit the expected velocity for the each of the one or more vehicles.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to the utilization of machine learning based algorithms. In the related art, a wide range of machine learning based algorithms have been applied to image or pattern recognition, such as the recognition of obstacles or traffic signs of other cars, or the categorization of elements based on a specific training. In view of the advancement in power computations, example implementations can utilize machine learning towards modeling the expected velocity of a vehicle for a given route.

Example implementations are directed to facilitating efficiency for the vehicle based on using connectivity and onboard sensors of the vehicle. There can be multiple aspects to the example implementations described herein. In a first aspect, there is a vector trajectory estimation, which is directed to determining what the vehicle will do in next period of time (e.g., ten minutes, twenty minutes). Such estimation can include vehicle velocity, drive cycle, and other parameters, depending on the desired implementation. The vehicle trajectory estimation is determined from machine learning as applied to historical driving data on one or more portions of a route (e.g., road segments) as well as other inputs from vehicle to infrastructure, and vehicle to vehicle estimation. The estimated velocity trajectory/drive cycle is used to classify drive cycle and determine equivalent drive cycles from historical driving data.

Once the estimation is obtained, the vehicle controller can conduct optimization of the controls based on the vehicle speed profile. Thus in example implementations, the vehicle trajectory estimation uses machine learning. So it fuses information from historic driving data on that route, on that road segment, along with other inputs from vehicle to infrastructure and vehicle to vehicle communication. Onboard sensors can correct any errors in the estimation to apply the machine learning prediction to the current situation of the vehicle. The errors detected by on-board sensors are reported back to the cloud server which in-turn is used to improve estimations.

Figure 1:
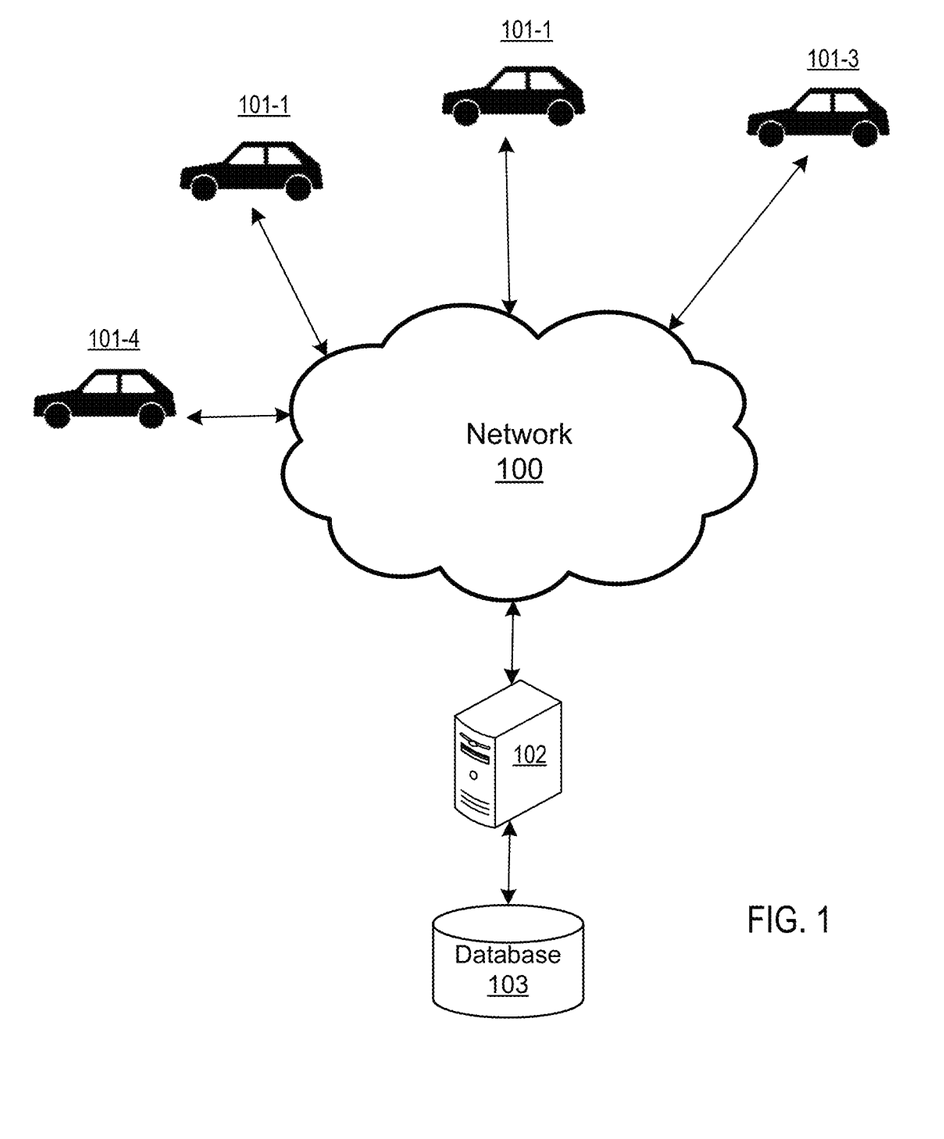
FIG. 1 illustrates a system involving one or more vehicles and a management apparatus, in accordance with an example implementation.

FIG. 1 illustrates a system involving one or more vehicles and a management apparatus, in accordance with an example implementation. One or more vehicles or vehicle systems such as on board diagnostics (OBD) 101-1, 101-2, 101-3, and 101-4 are communicatively coupled to a network 100 which is connected to a management apparatus 102. The management apparatus 102 manages a database 103, which contains data feedback aggregated from the vehicles and vehicle systems in the network 100. In example implementations, the data feedback from the vehicle and vehicle systems 101-1, 101-2, 101-3, and 101-4 can be aggregated to a central repository or central database such as proprietary databases that aggregate data from vehicle or vehicle systems such as enterprise resource planning systems or cloud storage systems, and the management apparatus 102 can access or retrieve the data from the central repository or central database.

Figure 3A:
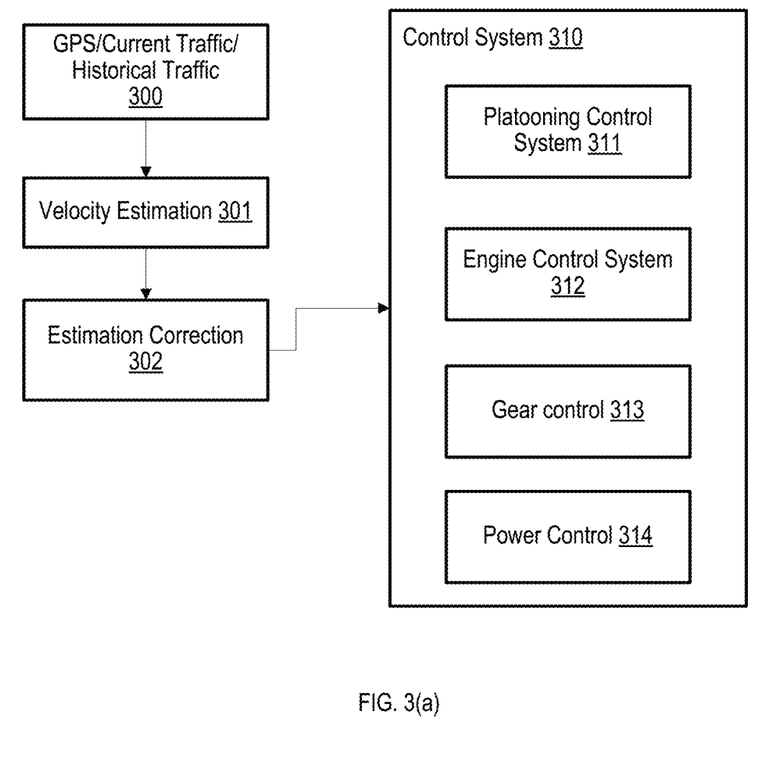
FIG. 3(a) illustrates an example flow for controlling the vehicle based on estimated velocity, in accordance with an example implementation.
Figure 3B:
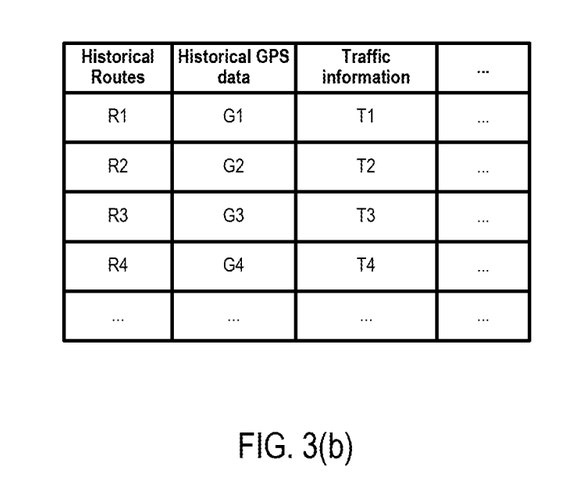
FIGS. 3(b) and 3(c) illustrate example management information, in accordance with an example implementation.

In an example implementation of FIG. 1, the vehicle systems 101-1, 101-2, 101-3. 101-4 can be configured to provide route information (e.g., the GPS route that the vehicle will traverse) to the management apparatus 102. Management apparatus 102 is configured to receive the route information from the one or more vehicles; determine an expected velocity for each of the one or more vehicles for one or more portions of a route determined from route information associated with the each of the one or more vehicles; and transmit the expected velocity for the each of the one or more vehicles as illustrated in FIG. 4(b). Depending on the desired implementation, management apparatus 102 can be configured to determine the expected velocity for the each of the one or more vehicles based on a GPS route input to the each of the one or more vehicles and historical trip information as illustrated in FIGS. 3(a) and 3(b). The one or more vehicles can be configured to modify the expected velocity for the one or more portions of the route based on data received from one or more sensors associated with the one or more vehicles.

Figure 4A:
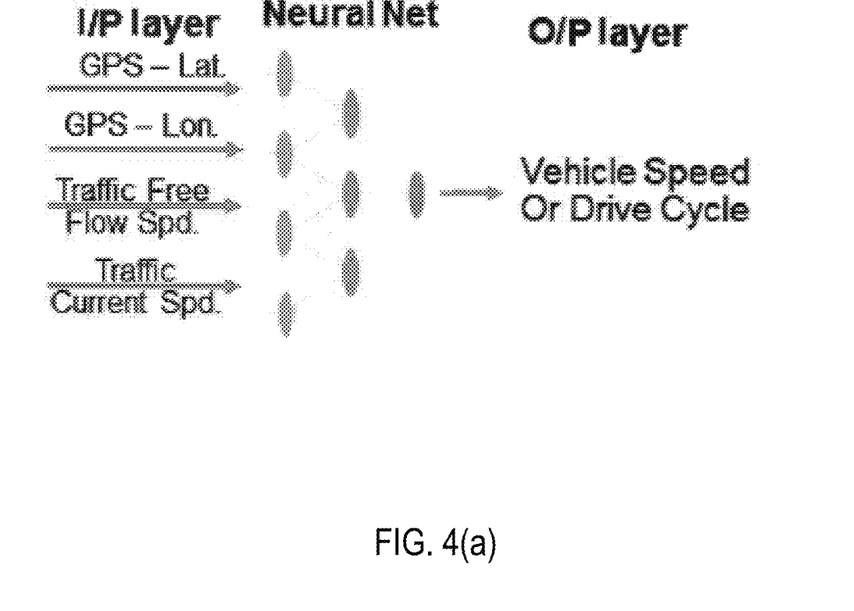
FIGS. 4(a) and 4(b) illustrate aspects of the machine learning process, in accordance with an example implementation.
Figure 4B:
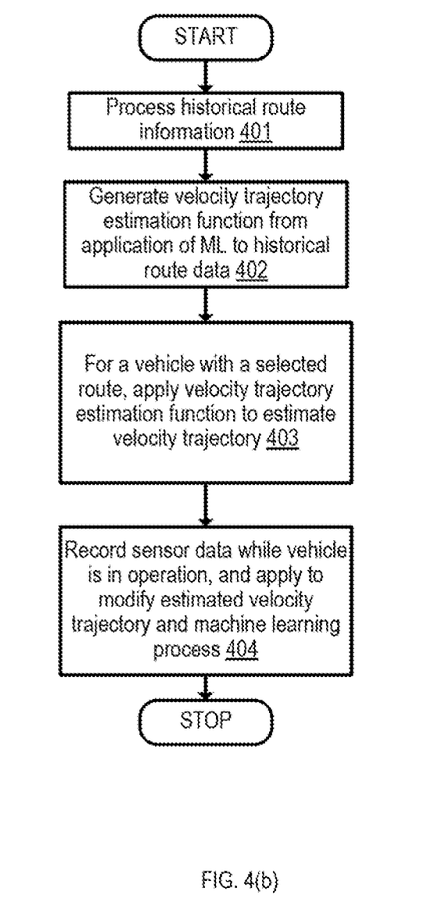

In an example implementation, management apparatus 102 can be configured to construct a velocity trajectory estimation function to determine the expected velocity for the vehicle for the one or more portions of the route from a machine learning process, wherein the machine learning process is configured to process as input, historical GPS information and historical traffic information for one or more historical routes; and generate the velocity trajectory estimation function to be configured to process a route of the each of the one or more vehicles as input to determine the expected velocity as illustrated in FIGS. 4(a) and 4(b).

Figure 5A:
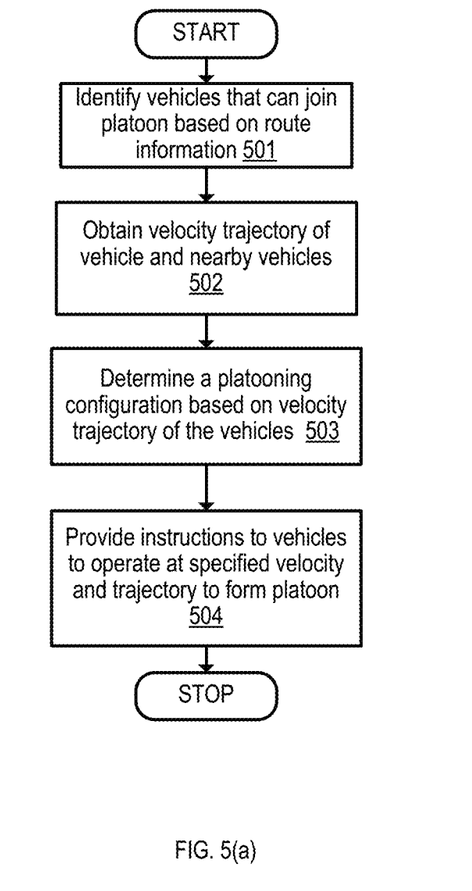
FIGS. 5(a) to 5(c) illustrate aspects of vehicle control based on estimated velocity trajectory, in accordance with an example implementation.

In an example implementation, management apparatus 102 is configured to execute the flow diagram of FIG. 5(a) to identify vehicles from the one or more vehicles that can join a platoon based on the route information; determine a platooning configuration for one or more road segments of the route information for the identified vehicles based on the estimated velocity of the one or more vehicles; and transmit instructions to the identified vehicles for entering the platooning configuration, the instructions comprising a velocity and a trajectory for the one or more road segments.

Figure 5B:
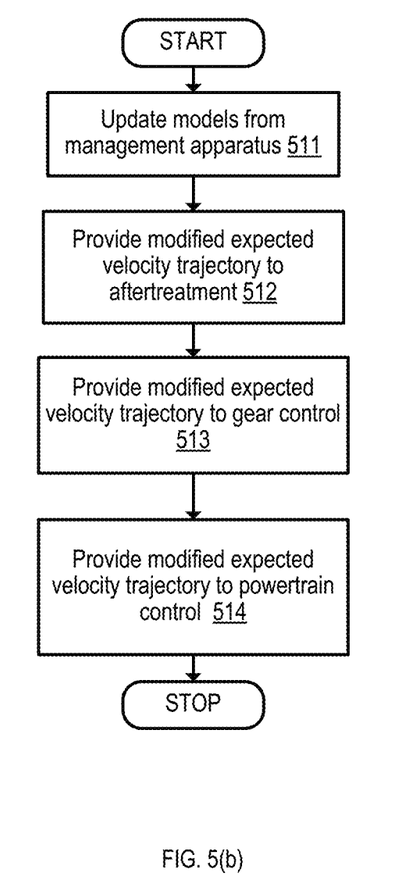

In an example implementation, management apparatus 102 is configured to provide models to the one or more vehicles for at least one of an aftertreatment system, gear control system and powertrain control system, each of the models configured to control the vehicle based on an input of the estimated velocity for one or more road segments of the route information as illustrated in FIG. 5(b).

Figure 2:
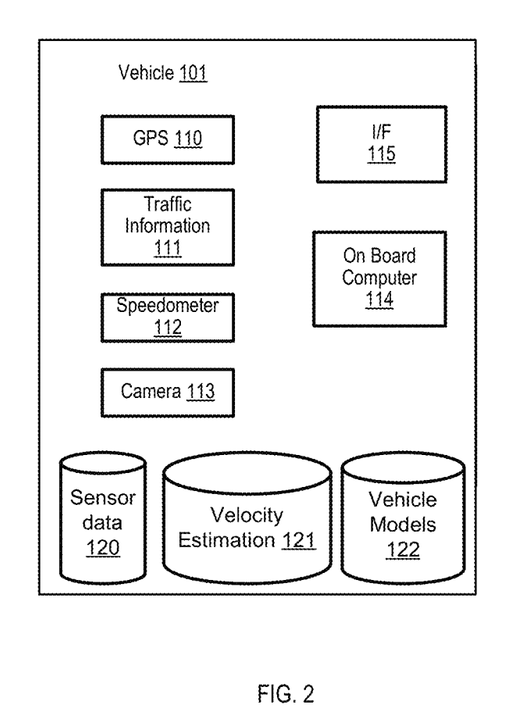
FIG. 2 illustrates an example vehicle system, in accordance with an example implementation.

FIG. 2 illustrates an example vehicle system 101, in accordance with an example implementation. Vehicle system 101 can involve sensors Global Positioning Satellite (GPS) 110, Traffic Information 111, Speedometer 112, one or more cameras 113, and a network interface (I/F) 115 that is configured to facilitate communications within the vehicle via on board diagnostic (OBD) interface or car area network (CAN) interface, as well as communicate with a cloud or management apparatus 102 via wireless or other methods depending on the desired implementation. Vehicle system 101 may also include on board computer (OBC) 114 configured to manage the functions of the vehicle system 101 as well as execute example implementations described herein based on the desired implementation. Vehicle system 101 may also be configured to store sensor data 120 and velocity estimations 121 for a given route, and vehicle models 122 that can be configured to provide models for the aftertreatment, gear-shift, and powertrain functions.

The OBC 114 may be configured with one or more processors that are configured to determine an expected velocity for the vehicle for one or more portions of a route; modify the expected velocity for the one or more portions of the route based on data received from the one or more sensors; and control at least one of an after-treatment system and a gear shift system of the vehicle based on the modified expected velocity as illustrated in FIG. 3(a). The OBC 114 can be configured to determine the expected velocity for the vehicle based on a GPS route input to the vehicle and historical trip information as illustrated in FIG. 3(b), wherein the data received from the one or more sensors comprises traffic information along the route.

Depending on the desired implementation, the OBC 114 may be configured to construct a velocity trajectory estimation function to determine the expected velocity for the vehicle for the one or more portions of the route from a machine learning process, the machine learning process configured to process as input, historical GPS information and historical traffic information for one or more historical routes as illustrated in FIG. 3(b); and generate the velocity trajectory estimation function to be configured to process a route of the vehicle as input to determine the expected velocity as illustrated in FIGS. 4(a) and 4(b).

OBC 114 may be configured to engage a vehicle platooning system as illustrated in FIG. 3(a) receive vehicle platooning instructions for a portion of the one or more portions of the route based on the modified expected velocity; and control the vehicle according to the vehicle platooning instructions for the portion of the one or more portions of the route based on the modified expected velocity and a trajectory determined for the portion of the one or more portions of the route as illustrated in FIG. 5(a).

As described in FIG. 5(b), the OBC 114 may be configured to control an aftertreatment system of the vehicle to produce $NO_X$ based on the modified expected velocity, and determine $NO_X$ production for the aftertreatment system for the one or more portions of the route based on the modified expected velocity. Similarly, OBC 114 may be configured to control at least one of a gear shift and a gear ratio of the vehicle for the one or more portions of the route based on the modified expected velocity.

FIG. 3(a) illustrates an example flow for controlling the vehicle based on estimated velocity, in accordance with an example implementation. In the vehicle system 101, when the vehicle is in operation, information such as sensor data (e.g., GPS 110, traffic information 111, speedometer 112, camera 113) is recorded and stored in the memory of the vehicle system 101 at 300. The sensor data, along with historical traffic information and the present route is then provided to the velocity estimation 121 at 301, wherein the velocity estimation is configured to predict upcoming velocity along the present route (e.g., in the next x period of time). Such estimations can be provided for one or more sections or road segments of the route (e.g., identified straightaways, per block, per traffic light, etc.), depending on the desired implementation. Such information is then provided to estimation correction 302 to modify the predicted velocity based on current sensor information. For example, if the road segment in question is disrupted by a traffic accident or construction, then present sensor data (e.g., updated traffic information), can be utilized to update the estimated velocity for the affected segment in accordance with the desired implementation.

After the modified estimated velocity is determined, such information is provided to control system 310 of the vehicle, which can be configured to supply parameters/instructions to the platooning control system 311, the engine control system 312, the gear shift/control system 313, and the power control 314. Other functionality of the vehicle can also be controlled, depending on the desired implementation and the present disclosure is not particularly limited to the examples of FIG. 3(a).

In an example implementation, vehicle platooning control system 311 receives instructions from management apparatus 102 or from other vehicles 101 to facilitate vehicle platooning among vehicles within an area of the vehicle. Such instructions can include changing of the vehicle trajectory, maintaining of the vehicle distance between nearby vehicles, adjusting the velocity based on the nearby vehicles, and so on, depending on the desired implementation. In such an example implementation, management apparatus 102 can be configured to receive estimated velocities from vehicles in the proximity of the vehicle or predicted to be in proximity based on predicted vehicle trajectories, and provide platooning instructions in accordance with a desired implementation. Such analytics can also be performed on the edge side by the vehicles that will participate in the platoon, and such communications can be transmitted between vehicles via vehicle to vehicle (V2V) interface from network I/F 115.

In an example implementation, engine control system 312 can be configured to control the aspects of the engine and the aftertreatment system. Given a predicted velocity from the vehicle trajectory estimation, engine control system 312 can be configured to change the engine speed and the fuel injection timing to optimize, e.g., maximize the production of $NO_X$ while optimizing, e.g., minimizing fuel consumption based on the produced $NO_X$, while being within constraints of allowed $NO_X$ production. Such example implementations can thereby manage the aging of the aftertreatment system and extend the lifetime of the system. Other aspects can be controlled by the engine control system 312, such as exhaust temperatures, start/stop control, and so on, in accordance with a desired implementation.

In an example implementation, gear control 313 can be configured to control the gear changing and braking events based on the estimated velocity trajectory. For example, gears can be shifted and/or the gear ratios can be changed based on upcoming expected velocities for upcoming road segments, and regenerative braking can be similarly engaged. Gear control 313 can be configured to control the gear shift timing or gear ratio based on generated staggered platoons from vehicle platooning control system 313, which provides the platooning configuration for gear control 313 in anticipation of entering a staggered platoon.

In an example implementation, power control system 314 can be used to control the power input to the vehicle and other functions of the powertrain. Such functions can include, engine power input, engine start-stop, heating, ventilating, and air conditioning (HVAC) loads, and so on depending on the desired implementation.

Figure 3C:
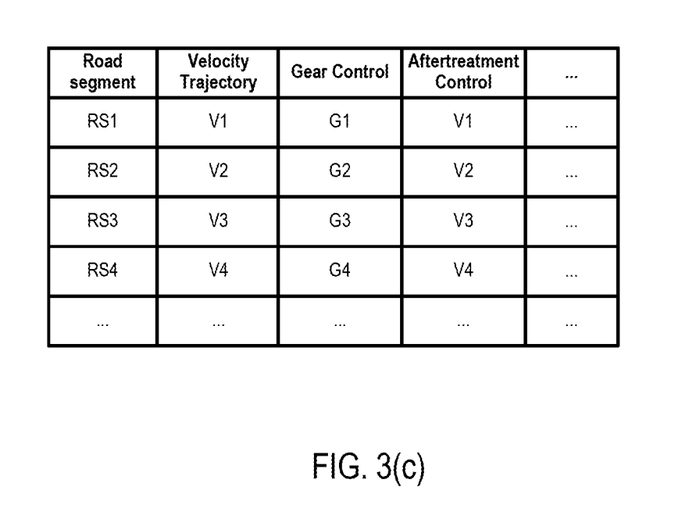

FIGS. 3(b) and 3(c) illustrate example management information, in accordance with an example implementation. Specifically, FIG. 3(b) illustrates example historical information that can be utilized in the machine learning process. Such information can include historical routes that were traveled by the vehicle or other vehicles (e.g., path from point A to point B for vehicle X), GPS data associated with the routes, traffic information along the route (e.g., congestion level, weather data, road type, road grade, etc.), and so on depending on the desired implementation. Other information that can also be included include trip time for a route, average speed of the vehicle, and other information that can be considered for machine learning.

FIG. 3(c) illustrates example management data based on execution of the machine learning generated function, in accordance with an example implementation. When a route is selected for a vehicle to travel from one point to another point, the route can be divided into road segments, each of which is associated with a velocity trajectory. The velocity trajectory can include the predicted velocity of the vehicle, along with the expected direction of the vehicle. The vehicle trajectory can also be modified based on received sensor information from one or more sensors of the vehicle. For example, if current traffic information indicates that the velocity is not expected to be as high due to higher than normal traffic, then the velocity can be modified downwards based on the traffic level.

Once the velocity trajectory information is determined, then the velocity trajectory information can be applied to models associated with the aftertreatment and the gear control to generate parameters for the control systems for each road segment. Such models can include determining a gear shift or gear ratio for each of the road segments, as well as a production of $NO_X$ for each of the road segments, as stored in vehicle models 122. The models can be provided from the management apparatus 102, or can be pre-configured into the vehicle depending on the desired implementation.

FIGS. 4(a) and 4(b) illustrate an example machine learning process, in accordance with an example implementation. As illustrated in FIG. 4(a), example implementations utilize machine learning based vehicle speed prediction to determine the electric horizon. The inputs from GPS and traffic flow speeds can be utilized to train artificial neural network (ANN) models for predicting vehicle velocities on a given route. The model is utilized to predict vehicle velocities for a test route until a sufficient correlation is met. As illustrated in FIG. 4(a) inputs can include the GPS (latitude/longitude) of a vehicle, the traffic information including the current velocity of vehicles for each of the one or more routes and the free flowing velocities for each of the one or more historical routes. The input is fed into a training process to train the ANN model until the ANN model is configured to provide an estimated velocity for a given test route within a desired margin of error. Once generated, the ANN model can be utilized to determine estimated velocities of a vehicle given the current route (e.g., GPS information of the route) and the historical traffic information.

FIG. 4(b) illustrates an example flow diagram for applying the machine learning process in accordance with an example implementation. In example implementations, machine learning is applied to generate a function for estimating vehicle trajectory when given a route as illustrated in FIG. 4(a). The flow of FIG. 4 can be implemented in the vehicle system 101, in the management apparatus 102, or functionality as described in FIG. 4 can be divided between both systems in accordance with the desired implementation.

At 401, the flow processes historical route information. The historical data can involve data stored in the database 103 and/or sensor data 120 as illustrated in FIG. 3(a). At 402, the flow generates the velocity trajectory estimation function from the application of machine learning to historical route information, as illustrated in FIG. 4(a). Depending on the desired implementation, the velocity trajectory estimation function can be optimized to provide an estimated velocity within a certain correlation for selected test routes. The vehicle trajectory estimation function is thereby configured to predict the upcoming velocity and trajectory for one or more road segments of a given route as illustrated in FIG. 4(b), and then provide such estimations to the vehicle controller to control various functions of the vehicle.

At 403, for a given vehicle that is in operation, the flow determines the velocity trajectory for a route input into the vehicle or associated with a vehicle in operation. Such route information can include GPS information input into the vehicle by the driver, can be conducted through an application on a mobile device, or through other methods depending on the desired implementation. Based on historic driving data, destination of the drive can be estimated and driver can be asked to confirm the destination. In an example implementation, the OBC continually estimates the route for next 'x' amount of time (sec/minutes) without explicit driver input based on historical driving data.

At 404, while the vehicle is in operation, sensor data 120 is recorded and utilized to update the estimated velocity and trajectory while the vehicle is in operation, Further, such data is stored is sensor data 120 which can be utilized as historical sensor data to be applied to the machine learning process for regenerating or updating the machine learning process as illustrated in FIG. 4(a).

FIGS. 5(a) and 5(b) illustrate aspects of vehicle control based on estimated velocity trajectory, in accordance with an example implementation. The example of FIG. 5(a) illustrates an example flow for engaging the platooning configuration system 311; however, one or more of the flows may also be executed in management apparatus 102, depending on the desired implementation. At 501, the flow identifies vehicles that can join the platoon based on route information. Such identification can be based on vehicles that are determined to be or that will be in the vicinity of each other for a given road segment, or through other methods depending on the desired implementation. At 502, the flow obtains the estimated velocity trajectory all of the identified vehicles eligible for the platoon. The estimated velocity trajectory can be communicated to each vehicle over the network 100. At 503, the flow determines a platooning configuration based on the obtained estimated velocity trajectories. Such a configuration can be determined based on the platooning configuration system 311 or by the management apparatus 102 through the implementations of one or more models constructed according to the desired implementation. At 504, the instructions are then provided to the vehicles in the platoon to operate at the specified velocity and trajectory for designated road segments to form the platoon. The instructions can be provided to the platooning configuration system, which can then control the vehicle to facilitate the platoon.

FIG. 5(b) illustrates aspects of vehicle control based on the estimated velocity as applied to vehicle models 122. The vehicle models can include aftertreatment models utilized by engine control system 312, gear models utilized by gear control 313, and power models utilized by power control 314. At 511, the vehicle is configured to update the vehicle models 122 from the management apparatus 102. Such models can include aftertreatment system for engine control system 312, gear control system 313 and powertrain control 314, such that each of the models configured to control the vehicle based on an input of the estimated velocity for one or more road segments of a given route. Other models that can be utilized involve control and plant models, and prevalent calibration parameters/maps for the system/sub-system being optimized.

At 512, the modified expected velocity trajectory can be provided to the aftertreatment model utilized by the engine control system 312. The aftertreatment system can be configured to control the production of $NO_X$ for the vehicle based on a function for minimization of fuel consumption. An example of such a function can be:

$$\min(F(x,u))=\min \Sigma \dot{m}(P_{powertrain}|P_{driver})$$

Where, x is the state variable can represent various states of the vehicle system (e.g. engine on or off, battery state of charge (SOC)), u is control input (e.g. start of injection, gear number, throttle, fuel pressure etc.), $\dot{m}$ is the fuel flow rate, Ppowertrain is power from powertrain system and $P_{driver}$ is driver's power demand.

Accordingly, engine control system can be configured to modify torque and engine speed according to the modified expected velocity trajectory.

At 513, the modified expected vehicle trajectory can be applied to the gear control system 313 to change the gear ratios or the gear shift. For example, if the upcoming road segment indicates that the vehicle will be in lower velocity, the gears may be shift downward, and vice versa depending on the desired implementation, in a predictive manner as opposed to reactive action thus improving system response and efficiency.

At 514, the modified expected vehicle trajectory can be applied to the powertrain control 314. Such power control can include HVAC, power input to the engine, battery control, and other operations in accordance with the desired implementation.

Figure 5C:
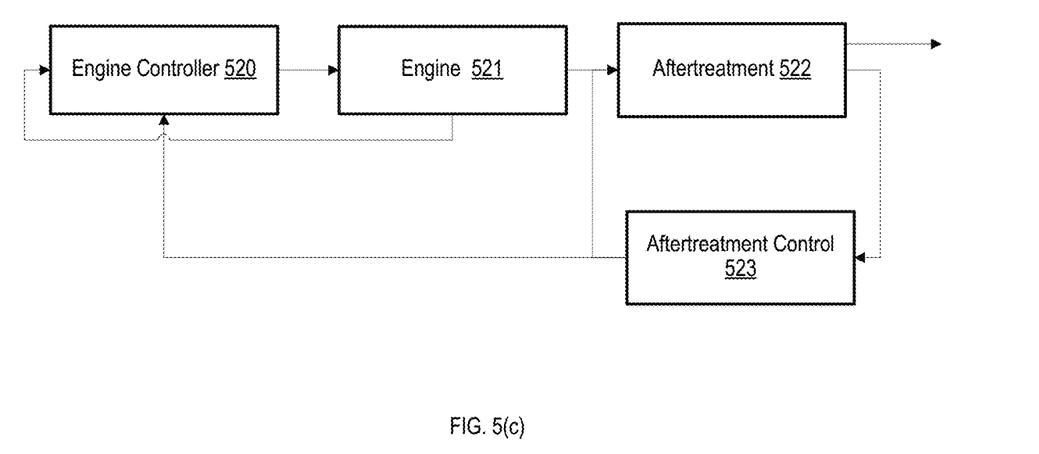

FIG. 5(c) illustrates an example flow for the engine control system 312, in accordance with an example implementation. The engine control system 312 can include an engine controller 520, engine 521, aftertreatment 522, and aftertreatment control 523. Based on the predicted velocity, aftertreatment control 523 is configured to issue instructions to increase or decrease production of exhaust chemical species or exhaust gas (e.g. NOx) from the engine while minimizing the fuel consumed 520 and manage the urea injection into the aftertreatment 522. Engine controller 520 processes sensor data from engine 521 and the feedback from aftertreatement control 523 to transmit instructions to the airpath actuators of engine 521. Engine 521 then facilitates the $NO_X$, generation of aftertreatment 522 based on the actuator control of engine 521, wherein aftertreatment 522 then oxidizes or reduces the exhaust chemical species (NOx, HC, CO and so on depending on the objective) of interest to be within the regulated limits.

Figure 6:
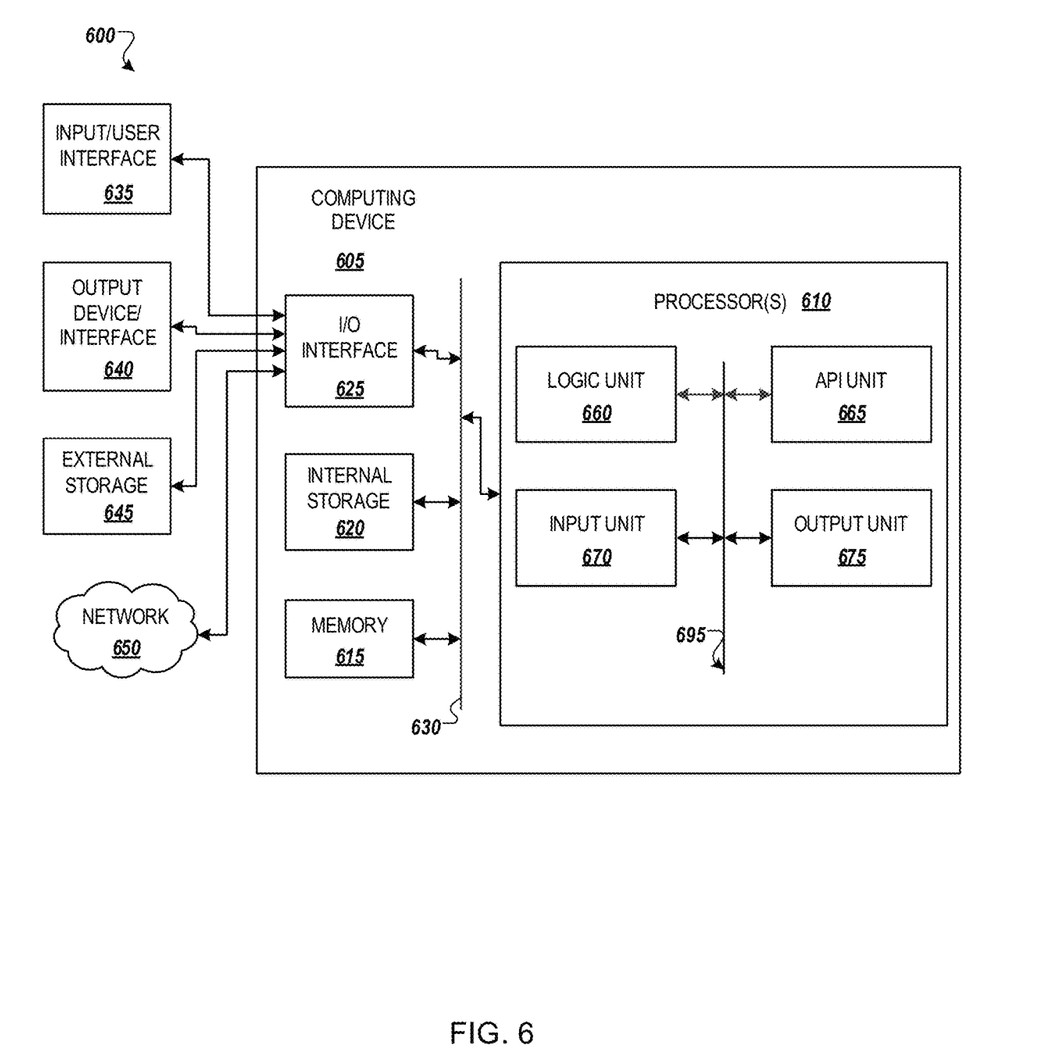
FIG. 6 illustrates an example computing environment with an example computer device suitable for use in some example implementations.

FIG. 6 illustrates an example computing environment with an example computer device suitable for use in some example implementations, such as a management apparatus 102 as illustrated in FIG. 1 and/or vehicle system 101/OBC 114 as illustrated in FIG. 2. Functionality described herein can be implemented at the management apparatus 102, at the vehicle system 101, the OBC 114, or facilitate through a system based on some combination of such elements, depending on the desired implementation.

Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Memory 615 can be configured to store historical traffic information as illustrated in FIG. 3(b) and, when a route is given to GPS 110 of vehicle 101, management information regarding one or more portions of the route in terms of road segments, estimated velocity trajectory, and vehicle parameters as illustrated in FIG. 3(c).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A vehicle, comprising:
   a processor, configured to:
   determine an expected velocity for the vehicle for one or more portions of a route, the expected velocity determined from a velocity trajectory estimation function constructed from a machine learning process and configured to determine the expected velocity for the vehicle for the one or more portions of the route;
   modify the expected velocity for the one or more portions of the route based on data received from one or more sensors to correct error in the expected velocity determined from the velocity trajectory estimation function; and control an after-treatment system of the vehicle based on the modified expected velocity for the one or more portions of the route; and provide the data received from the one or more sensors to correct error in the expected velocity to the machine learning process.

2. The vehicle of claim 1, wherein the velocity trajectory estimation function is configured to determine the expected velocity for the vehicle based on a global positioning satellite route (GPS) input to the vehicle and historical trip information, wherein the data received from the one or more sensors comprises traffic information along the route.

3. The vehicle of claim 1, wherein the processor is configured to:

construct the velocity trajectory estimation function to determine the expected velocity for the vehicle for the one or more portions of the route from the machine learning process, the machine learning process configured to:

process as input, historical global positioning satellite (GPS) information and historical traffic information for one or more historical routes; and generate the velocity trajectory estimation function to be configured to process a route of the vehicle as input to determine the expected velocity.

4. The vehicle of claim 1, wherein the processor is configured to:

receive vehicle platooning instructions for a portion of the one or more portions of the route based on the modified expected velocity; and control the vehicle according to the vehicle platooning instructions for the portion of the one or more portions of the route based on the modified expected velocity and a trajectory determined for the portion of the one or more portions of the route.

5. The vehicle of claim 1, wherein the processor is configured to:

determine exhaust gas production for an after-treatment system for the one or more portions of the route based on the modified expected velocity; and control the after-treatment system of the vehicle to meet vehicle driving performance parameters and minimize fuel consumption while maintaining the exhaust gas production for the one or more portions of the route.

6. The vehicle of claim 1, wherein the processor is configured to:

control at least one of a gear shift and a gear ratio of the vehicle for the one or more portions of the route based on the modified expected velocity.

* * * * *